Figure 1:
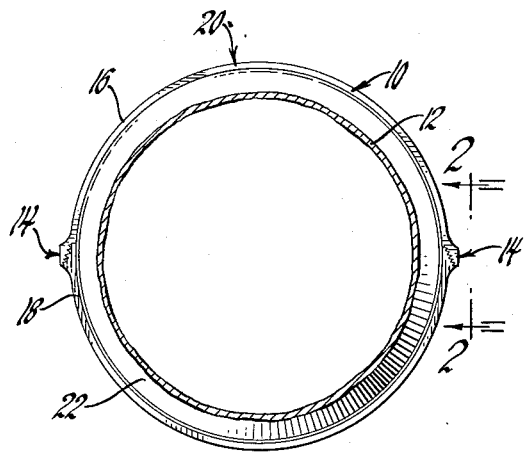

Dec. 26, 1961  C. J. McDOWALL  3,014,741
MULTI-MEMBER JOINT
Filed Dec. 6, 1957  2 Sheets-Sheet 1

INVENTOR.
Charles J. McDowall
BY Paul Fitzpatrick
ATTORNEY

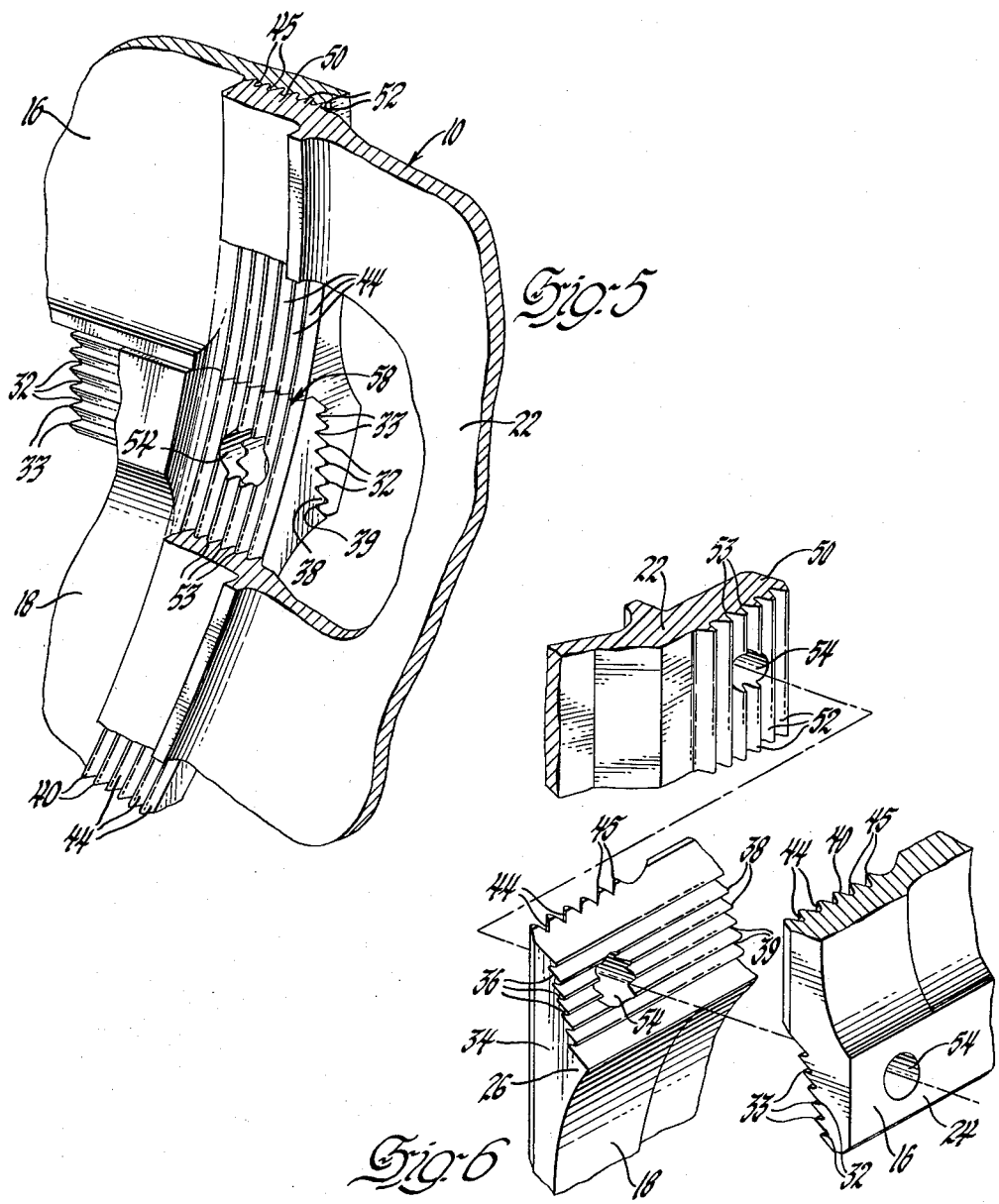

United States Patent Office 3,014,741
Patented Dec. 26, 1961

3,014,741
MULTI-MEMBER JOINT
Charles J. McDowall, Indianapolis, Ind., assignor to General Motors Corporation, Detroit, Mich., a corporation of Delaware
Filed Dec. 6, 1957, Ser. No. 701,199
2 Claims. (Cl. 285—330)

This invention relates to multipiece casings containing fluid under pressure, and is particularly adapted to a casing structure for a gas turbine engine.

The casing for a gas turbine engine may be made up of a plurality of axially aligned annular sections comprising a compressor section casing, a combustion section casing, a turbine section casing, and an exhaust duct casing, all joined at their abutting ends by suitable flange means or similar connectors. The combustion section casing may comprise two semi-circular sections for greater accessibility and ease of repair and replacement. The compressor casing ordinarily is in two such sections. It is this type of construction, for example, a combustion section casing of two sections joined to each other and to a turbine section casing, that this invention is directed to. With such a construction, a joint means must be provided at the meeting planes of the three members rigid enough to prevent both axial and circumferential movement of any of the casing members. Also, the joint must be leak-tight, and must be as light in weight as practicable. Ease of assembly and disassembly also are important. In general, the invention relates to improved connections, both longitudinal and circumferential, in pressure-loaded casings such, for example, as those of gas turbines, having light weight and high strength, being easy to assemble, and leak-proof.

Therefore, this invention relates to a gas turbine engine joint means for joining the upper and lower halves of a combustion section or other engine casing to each other and to the turbine section casing or other engine casing to provide a tight circumferential fit.

This invention further relates to joint means joining the two halves of a gas turbine engine section casing to each other and to another section casing wherein both axial and circumferential movement of any member casing is prevented.

This invention also relates to a multi-membered joint means wherein the members are provided with a combination of horizontal and circumferential split line flanges for preventing movement when assembled of any member in any direction.

This invention further relates to multi-membered joint means wherein the members are provided alternately with male and female serrated flange means cooperating when engaged to prevent axial and circumferential movement of any member.

This invention finally relates to joint means for joining the upper and lower halves of a casing of a gas turbine engine to each other and to another casing by having male and female flanges formed on said casing members with interengaging ribs and grooves extending both axially and circumferentially such that when engaged, movement of any casing member in any direction is prevented.

Figure 2:
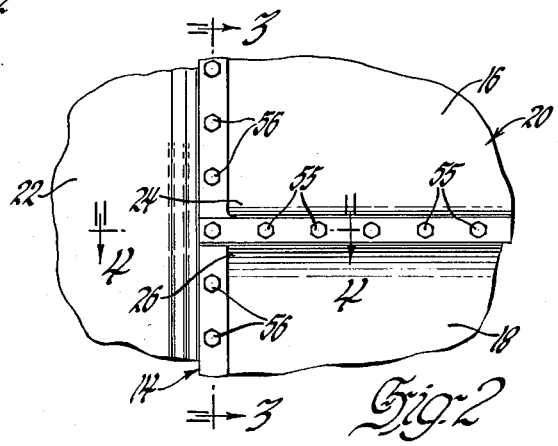
Figure 3:
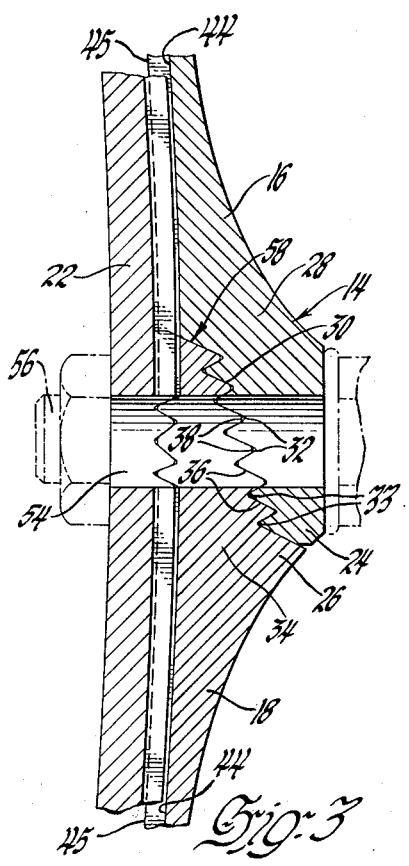
Figure 4:
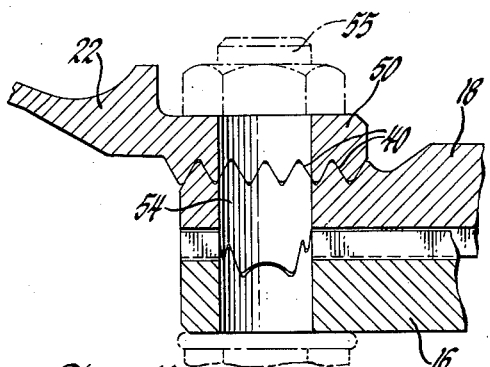

Other features, advantages and objects will become apparent by reference to the detailed description of the invention and to the drawings wherein:

FIGURE 1 is a cut-away rear end view of a gas turbine engine showing the joint means embodying this invention, FIGURE 2 is an enlarged partial side view of the engine casing as seen in the direction of the arrows 2—2 of FIGURE 1, FIGURE 3 is an enlarged cross-sectional view of the joint obtained by passing a plane through the side view of FIGURE 2 along the line 3—3, FIGURE 4 is an enlarged cross-sectional view of a portion of FIGURE 2 obtained by passing a plane through the line 4—4 of FIGURE 2, FIGURE 5 is an internal assembled perspective view of a portion of the casing of the engine with parts broken away and cross-sectioned, and FIGURE 6 is an exploded view of portions of the three members of the joint embodying this invention.

Referring now to the drawings and more particularly to FIGURE 1, the view in this figure is taken from the rear end of a gas turbine engine 10 looking forward to the combustion section casing, with the bulk of the turbine section casing being cut away at 12 to show the joint means 14 which is the subject of this invention. Referring to both FIGURES 1 and 2, the upper and lower substantially semi-circular halves or arcuate segments 16 and 18, respectively, of the combustion section casing 20 are shown joined to each other and each to the substantially annular turbine section casing 22. As seen in FIGURES 3, 4, 5 and 6, the upper half of the combustion casing is provided at its edge 24 adjacent the edge 26 of the lower half of the combustion casing with a female flange 28 formed internally with a generally longitudinal split line serration 30 providing a number of alternating spaced grooves 32 and ridges or ribs 33 extending axially the length of the casing. Suitably formed on the lower half of the combustion casing at its edge 26 is an oppositely constructed male flange 34 having a generally longitudinal split line serration 36 providing a number of alternating spaced grooves 39 and ribs or ridges 38 extending axially and adapted to mate with the grooves and ridges 32 and 33.

Additionally, each of the upper and lower portions or segments of the combustion casing are provided internally at their ends 24 and 26 adjacent the turbine casing 22 with circumferential split line serrations 40, each providing a number of spaced grooves 44 and ribs or ridges 45 extending circumferentially of the segments. Formed externally of the turbine casing 22 at its adjacent end is a further horizontal split line serrated male flange 50 providing a number of circumferentially extending spaced ribs or ridges 52 and grooves 53 adapted to mate with the grooves and ridges 44, 45 of the two combustion section casing halves 16 and 18.

Bolt holes 54 are suitably bored in each of the two combustion casing halves 16 and 18 and the turbine casing 22 for the insertion of suitable horizontal and circumferential split line bolts 55 and 56.

It is to be noted that the turbine casing 22 is made slightly oversize to provide an interference fit with the two combustion case halves 16 and 18.

To assemble the above described joint, by referring to FIGURES 5 and 6, it will be seen that the lower half 18 of the combustion casing is placed in position around the turbine casing with the parallel ridges 52, grooves 44, ridges 45 and grooves 53 interengaged. The upper half 16 of the combustion case is then placed in position engaging the grooves 32 and ridges 33 with the ridges 38 and grooves 39 of the lower combustion case section 18. This positions the grooves 44 and ridges 45 of the upper combustion half in alignment with the grooves 44 and ridges 45 of the lower half and abutting at 58 to present or form a continuous surface of aligned grooves and ridges for engagement by the parallel ridges 52 and grooves 53 of the turbine casing. The horizontal split line bolts are then inserted in the appropriate bolt holes 54 from the middle outward to the ends and tightened, thereby drawing the two combustion casing halves into position as shown in FIGURE 5 with the combustion halves engaging each other and each engaged by the turbine casing. The circumferential bolts 56 may then be inserted and tightened for the final assembly step. Floating nuts (partially shown in dotted lines) may be used in connection with both sets of bolts.

The two combustion section halves are thus prevented from relative circumferential movement by the male and female split line connection, and both the combustion halves and the turbine casing are prevented from relative axial movement by the additional split line connection, with the bolts preventing separation of any of the casing sections.

Thus, movement of any casing portion in any direction is prevented, and a tight circumferential fit is assured.

It will be clear that, while only the joint connecting the combustion casing halves and the turbine casing is shown, similar joint means could be used elsewhere in the gas turbine engine whenever a similar connection for a similar purpose is desired.

From the foregoing, it will be seen that this invention provides an inexpensive, easily assembled and disassembled joint for connecting three casing members of a gas turbine engine to prevent relative movement of any member in any direction, while assuring a tight joint. It will be understood that the invention can be modified beyond the illustrated embodiments, and therefore, any limitations to be imposed are those set forth in the following claims.

I claim:

1. In combination, thin first and second longitudinally extending arcuate members adapted to be connected to each other and both to a further thin longitudinally extending arcuate member, said first and second members being circumferentially arranged with respect to each other and engaged in a circumferentially overlapped relationship at their adjacent edges, the engaged arcuate surfaces of said edges being formed with mating circumferentially serrated portions when mated preventing circumferential separation of said first and second members, said first and second members also each being engaged in an overlapping end-to-end relationship with said further member, the arcuate surface of the engaged end of each of said first and second members being formed with an axially serrated portion, the arcuate surface of said further member having an axially serrated portion formed to mate simultaneously with both of the axially serrated portions of said first and second members upon engagement of all of said members, the mating of said portions preventing relative axial and circumferential movement between said members, and means to clamp said mating serrated portions together.

2. In combination, thin first and second longitudinally extending semi-cylindrical members facing each other and having engaged overlapping edges, a longitudinally extending cylindrical member engaging each of said semi-cylindrical members in an end-to-end overlapping relationship, and connecting means to join said members, said connecting means including mating circumferentially serrated portions formed on the arcuate surfaces of the engaged edges of said semi-cylindrical members when mated preventing circumferential separation of said semi-cylindrical members, the arcuate surface of the engaged end of each of said semi-cylindrical members being formed with an axially serrated portion, said axially serrated portions together constituting a circumferentially continuous serrated surface, the arcuate surface of said cylindrical member having an axially serrated portion formed to mate simultaneously with both of the axially serrated portions of said semi-cylindrical members upon engagement of all of said members, the mating of said portions preventing relative axial and circumferential movement between said members, said connecting means including means to clamp said mating portions together.

References Cited in the file of this patent

UNITED STATES PATENTS

| | | |
|---|---|---|
| 695,478 | McGeorge | Mar. 18, 1902 |
| 750,565 | Austin | Jan. 26, 1904 |
| 1,267,250 | Murray | May 21, 1918 |
| 1,730,612 | Hotchkiss | Oct. 8, 1929 |
| 1,949,984 | Walker | Mar. 6, 1934 |
| 2,473,415 | Doull | June 14, 1949 |
| 2,674,090 | Highberg | Apr. 6, 1954 |
| 2,727,286 | Moore | Dec. 20, 1955 |
| 2,736,451 | Fogg | Feb. 28, 1956 |
| 2,915,088 | Felter | Dec. 1, 1959 |